(12) United States Patent
Horikoshi et al.

(10) Patent No.: US 11,015,067 B2
(45) Date of Patent: May 25, 2021

(54) SLURRY FOR FLEXIBLE ELECTRODES, AND FLEXIBLE ELECTRODE USING SAME

(71) Applicant: DENKA COMPANY LIMITED, Tokyo (JP)

(72) Inventors: Yoko Horikoshi, Tokyo (JP); Tetsuya Ito, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 16/637,265

(22) PCT Filed: Aug. 6, 2018

(86) PCT No.: PCT/JP2018/029467
§ 371 (c)(1),
(2) Date: Feb. 6, 2020

(87) PCT Pub. No.: WO2019/031460
PCT Pub. Date: Feb. 14, 2019

(65) Prior Publication Data
US 2020/0165469 A1    May 28, 2020

(30) Foreign Application Priority Data

Aug. 7, 2017    (JP) .............................. JP2017-152292

(51) Int. Cl.
*H01B 1/24*        (2006.01)
*C09D 5/24*        (2006.01)
(Continued)

(52) U.S. Cl.
CPC ............... *C09D 5/24* (2013.01); *C09D 5/022* (2013.01); *C09D 7/68* (2018.01); *C09D 7/69* (2018.01);
(Continued)

(58) Field of Classification Search
CPC ... H01B 1/00; H01B 1/24; C09D 5/24; C08K 2201/001; C08K 2201/003
See application file for complete search history.

(56) References Cited

U.S. PATENT DOCUMENTS 9,136,035 B2    9/2015 Itou et al.
2012/0037853 A1    2/2012 Unagami et al.
(Continued)

FOREIGN PATENT DOCUMENTS

CN    102757700 A * 10/2012
EP    2988351 A1    2/2016
(Continued)

OTHER PUBLICATIONS

Rosset et al "Flexible and stretchable electrodes for dielectric elastomer actuators", Appl Phys A (2013) 110:281-307.*
(Continued)

*Primary Examiner* — Mark Kopec
(74) *Attorney, Agent, or Firm* — Caesar Rivise, PC (57) ABSTRACT

According to one of various aspects of the present invention, a slurry for a flexible electrode contains a component (a) dispersed in an aqueous emulsion. The emulsion includes one or more polymer components selected from the group consisting of acrylic polymers, urethane polymers, fluorine polymers, urea polymers, chloroprene polymers, and butadiene polymers. The emulsion has a pH of 6.5 to 8.0. In the slurry, the total of the polymer component(s) and the component (a) is 20 to 30% by mass. Of the total of the polymer component(s) and the component (a) in the slurry, the polymer component(s) is 60 to 85% by mass, and the component (a) is 15 to 40% by mass. Component (a) is carbon black having a DBP absorption amount under uncompressed conditions of 150 to 300 mL/100 g and a BET specific surface area of 35 to 140 $m^2/g$.

16 Claims, 1 Drawing Sheet

(51) Int. Cl.
*C09D 7/40* (2018.01)
*C09D 5/02* (2006.01)
*C09D 111/00* (2006.01)
*C09D 175/04* (2006.01)
*F03G 7/06* (2006.01)
*C08K 3/04* (2006.01)

(52) U.S. Cl.
CPC .............. *C09D 7/70* (2018.01); *C09D 111/00* (2013.01); *C09D 175/04* (2013.01); *F03G 7/06* (2013.01); *H01B 1/24* (2013.01); *C08K 3/04* (2013.01); *C08K 3/041* (2017.05); *C08K 3/042* (2017.05); *C08K 2201/001* (2013.01); *C08K 2201/003* (2013.01); *C08K 2201/005* (2013.01); *C08K 2201/006* (2013.01); *C08K 2201/011* (2013.01)

(56) References Cited

U.S. PATENT DOCUMENTS

| | | | | |
|---|---|---|---|---|
| 2014/0307364 | A1* | 10/2014 | Konishi | H01G 11/38 361/502 |
| 2015/0017533 | A1* | 1/2015 | Takahashi | H01M 10/052 429/217 |
| 2015/0200402 | A1 | 7/2015 | Yoshimoto et al. | |
| 2018/0251638 | A1* | 9/2018 | Kwon | H01M 4/625 |

FOREIGN PATENT DOCUMENTS

| | | | |
|---|---|---|---|
| JP | 200113015 | A | 1/2001 |
| JP | 2008198425 | A | 8/2008 |
| JP | 2010283927 | A | 12/2010 |
| JP | 2010283928 | A | 12/2010 |
| JP | 2014112514 | A | 6/2014 |
| JP | 201526595 | A | 2/2015 |
| JP | 201579724 | A | 4/2015 |
| JP | 2016134217 | A | 7/2016 |
| KR | 1476782 | B1 * | 12/2014 |
| WO | 2009157491 | A1 | 12/2009 |
| WO | 2012050128 | A1 | 4/2012 |
| WO | 2013069558 | A1 | 5/2013 |

OTHER PUBLICATIONS

English language machine translation of JP 2016-134217 (pub 2016).*
English language machine translation of JP 2015-026595 (pub 2015).*
English-language abstract for JP 2001013015 (2001).
English-language abstract for JP 2008198425 (2008).
English-language abstract for WO 2009157491 (2009).
English-language abstract for JP 2010283927 (2010).
English-language abstract for JP 2010283928 (2010).
English-language abstract for JP 2015079724 (2015).
English-language abstract for JP 2016134217 (2016).
International Search Report for PCT/JP2018/029467 dated Oct. 9, 2018.
Extended European Search Report dated Jul. 10, 2020.
Mitsubishi Chemical, "Introducing Mitsubishi Carbon Black Products. Table of Physical and Chemical Properties." retrieved on Jul. 17, 2020 from https://web.archive.org/web/20070718145750/http://www.carbonblack.jp/en/product/ist2_01.html (Jul. 18, 2007).

* cited by examiner

SLURRY FOR FLEXIBLE ELECTRODES, AND FLEXIBLE ELECTRODE USING SAME

CROSS-REFERENCE TO RELATED APPLICATIONS

This application is the U.S. National Phase Application of PCT/JP2018/029467, filed Aug. 6, 2018, which claims priority from JP 2017-152292, filed Aug. 7, 2017, the contents of which applications are incorporated herein by reference in their entireties for all purposes.

TECHNICAL FIELD

The present invention is related to a slurry for flexible electrodes and a flexible electrode using the same.

BACKGROUND ART

In recent years, actuators using polymer materials such as carbon nanotubes, ion conductive polymers, and dielectric elastomers have been proposed. Among them, actuators using a polymer material such as a dielectric elastomer (hereinafter referred to as a dielectric actuator) or the like are expected to be used in various fields such as artificial muscles, medical devices, nursing aids, and industrial robots because of their large output.

Figure 1:
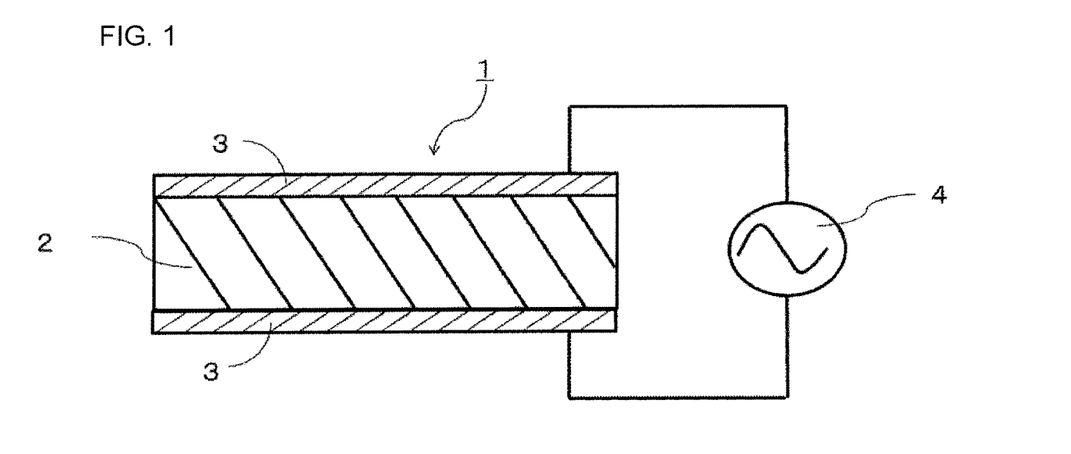
FIG. 1 is an explanatory diagram showing a method for implementing a dielectric actuator.

As illustrated in FIG. 1, the dielectric actuator 1 has a structure in which a dielectric layer 2 is sandwiched between a pair of electrode layers 3. When the voltage applied between the electrodes is increased, positive charges are accumulated in one electrode layer 3 and negative charges are accumulated in the other electrode layer 3. This increases the electrostatic attractive force occurring between the electrodes. For this reason, the dielectric layer 2 sandwiched between the electrodes is compressed in the film thickness direction, and the thickness of the dielectric layer 2 is reduced. As the film thickness decreases, the dielectric layer 2 extends in the surface direction of the electrode layer 3 accordingly. On the other hand, when the voltage applied between the electrodes is reduced, the electrostatic attractive force between the electrodes is reduced. For this reason, the force which compresses the dielectric layer 2 in a film thickness direction becomes smaller, and the film thickness becomes thick due to the elastic restoring force of the dielectric film. As the film thickness increases, the dielectric film contracts in the surface direction of the electrode layer 3. In this manner, the dielectric actuator 1 generates a driving force by extending and contracting the dielectric layer 2.

Here, when the flexibility of the electrode is poor, it is difficult to obtain a desired amount of displacement because the electrode may prevent the dielectric layer from being extended or contracted, or the electrode may break. Therefore, it is desirable that the electrode be flexible so as not to disturb the deformation of the dielectric layer and not to break. A flexible electrode can be produced, for example, by coating slurry made of a conductive agent on a slurry made of a base material such as rubber or elastomer. In this case, it is necessary to disperse the conductive agent throughout the base material in order to ensure the conductivity of the electrode. For this reason, the filling amount of the conductive agent is increased. When the filling amount of the conductive agent is increased, the conductivity at the natural length of the electrode is improved, but the electrode may break at the time of extending and the conductivity may be lost. Furthermore, the viscosity of the slurry increases, making coating difficult. On the other hand, if the filling amount of the conductive agent is reduced in order to ensure flexibility and coatability, the conductivity is lowered and electric charge cannot be supplied to the dielectric layer sufficiently. In addition, when the electrode is greatly extended together with the dielectric layer, the distance between the conductive agents is increased, so that the conductive path is cut and the electric resistance is increased. Thus, an electrode slurry, which satisfies a desired conductivity, flexibility, and coatability at the same time, has not yet been realized.

As an improvement measure, there is a method using a slurry in which carbon nanotubes are dispersed in a matrix. (Patent Document 1)

PRIOR ART DOCUMENT

Patent Document

[Patent Document 1] JP4771971B1

SUMMARY OF INVENTION

Technical Problem to be Solved by the Invention

However, since it is indispensable to use CNT which is a nanomaterial in patent document 1, it is necessary to take into consideration the possibility of an influence on health. In addition, the volume resistance value at the time of 150% elongation is 80 Ωcm or more. In addition, since organic solvent and ultrasonic homogenizer are used at the time of preparation of the electrode, there is a risk that the organic solvent may be heated and it may ignite.

The problem to be solved by the present invention is to provide a slurry such that the change in resistance value when the electrode is extended can be suppressed, and a flexible electrode that does not break when extended can be produced.

Solution for Solving the Problem

The present invention is characterized in that a specific emulsion contains the following specific component (a), or containing the following component (a) and component (b).

Component (a): carbon black having a DBP absorption amount under uncompressed conditions of 150 to 300 mL/100 g and a BET specific surface area of 35 to 140 m$^2$/g.

Component (b): one or more carbons selected from the group consisting of the following α, β, γ, and δ
α: carbon nanotube having a fiber diameter of 1 to 20 nm
β: graphene having a diameter of 0.5 to 10 μm
γ: graphite having a diameter of 0.5 to 10 μm
δ: carbon black having a DBP absorption amount under uncompressed conditions of 350 to 500 mL/100 g and a specific surface area of 800 to 1300 m$^2$/g Note that the DBP absorption amount under uncompressed conditions of carbon black in the present invention is a value measured in accordance with JIS K6217-4.

The emulsion comprises one or more polymer components selected from the group consisting of chloroprene polymers, urethane polymers, fluorine polymers, urea polymers, acrylic polymers, and butadiene polymers, and when the pH of the emulsion is 6.5 to 8.0, the dispersibility of specific components in the slurry can be improved.

Effect of the Invention

The most important feature of the present invention is that the electric resistance value can be suppressed from increasing when the electrode is extended. Specifically, in the slurry of the present invention, since the above-mentioned specific components are uniformly dispersed in the specific emulsion, a uniform conductive path can be formed throughout a produced electrode. A flexible electrode having an electric resistance of less than 80 Ω·cm at 150% strain and an electric resistance of less than 500 Ω·cm at 200% strain, which does not break at the time of extension, can be produced.

EMBODIMENTS FOR CARRYING OUT THE INVENTION

Next, embodiments of the present invention will be described in detail.

The present embodiment is a slurry for a flexible electrode obtained by dispersing the above-mentioned component (a) in an aqueous emulsion having a pH of 6.5 to 8.0.

In the present embodiment, as the polymer component(s) contained in the emulsion, it is desirable to use the following component(s).

Polymer component(s): the emulsion comprising at least one polymer selected from the group consisting of chloroprene polymers, urethane polymers, fluorine polymers, urea polymers, acrylic polymers, and butadiene polymers. Among these, urethane polymers and chloroprene polymers are particularly preferable in terms of flexibility, conductivity and dispersibility.

The pH of the emulsion used in the present embodiment is preferably 6.5 to 8.0. When the pH of the emulsion is less than 6.5, the dispersibility of the component (a) may be deteriorated. When the pH of the emulsion is higher than 8.0, the dispersibility of the component (a) may be deteriorated.

In the slurry for a flexible electrode according to the present embodiment, the total of the polymer component(s) and the component (a) is preferably 20 to 30% by mass. If the total of the polymer component(s) and the component (a) is less than 20% by mass, the amount of water to be dried thus increases, and a uniform electrode may not be produced. On the other hand, if it is more than 30% by mass, the viscosity of the slurry for a flexible electrode thus increases, and the coatability may deteriorates.

In the slurry for a flexible electrode according to the present embodiment, of the total of the polymer component(s) and the component (a), the proportion of the polymer component(s) is preferably 60 to 85% by mass, and the proportion of the component (a) is preferably 15 to 40% by mass. If the proportion of the component (a) is less than 15% by mass, conductivity becomes difficult to be exhibited. Conversely, if the proportion of the component (a) is more than 40% by mass, the produced electrode becomes hard and may break, or the dispersibility may deteriorate.

The component (a) is preferably carbon black having a DBP absorption amount under uncompressed conditions of 150 to 300 (mL/100 g) and a BET specific surface area of 35 to 140 (m$^2$/g). That is, if the DBP absorption amount under uncompressed conditions and the BET specific surface area are too small, the conductivity-imparting effect at the time of producing a flexible electrode may decrease, and if the DBP absorption amount under uncompressed conditions and the BET specific surface area are too large, the slurry will not be uniform.

Note that the DBP absorption amount under uncompressed conditions of carbon black in the present embodiment is a value measured in accordance with JIS K6217-4.

Further, in another present embodiment, the component (a) and a following component (b) may be used in combination.

Component (b): one or more carbons selected from the group consisting of the following α, β, γ, and δ

α: carbon nanotube having a fiber diameter of 1 to 20 nm
β: graphene having a diameter of 0.5 to 10 μm
γ: graphite having a diameter of 0.5 to 10 μm
δ: carbon black having a DBP absorption amount of under uncompressed conditions 350 to 500 mL/100 g and a specific surface area of 800 to 1300 m$^2$/g In the present embodiment, as the polymer component(s) contained in the emulsion, it is desirable to use the following component(s).

Polymer component(s): the emulsion comprising at least one polymer selected from the group consisting of chloroprene polymers, urethane polymers, fluorine polymers, urea polymers, acrylic polymers, and butadiene polymers. Among these, urethane polymers and chloroprene polymers are particularly preferable in terms of flexibility, conductivity and dispersibility.

The pH of the emulsion used in the present embodiment is preferably 6.5 to 8.0. When the pH of the emulsion is less than 6.5, the dispersibility of the component (a) may be deteriorated. When the pH of the emulsion is higher than 8.0, the dispersibility of the component (b) may be deteriorated.

In the slurry for a flexible electrode according to the present embodiment, it is preferable that the total of the polymer component(s) and the component (a) is 20 to 30% by mass. If the total of the polymer component, component (a), and component (b) is less than 20% by mass, the amount of water to be dried thus increases, and a uniform electrode may not be produced. On the other hand, if it is more than 30% by mass, the viscosity of the slurry for a flexible electrode thus increases, and the coatability may deteriorates.

In the slurry for a flexible electrode according to the present embodiment, of the total of the polymer component (s), the component (a) and the component (b), it is preferable that the polymer component(s) is 60 to 85% by mass, and the total of the component (a) and the component (b) is 15 to 40% by mass. When the total of the component (a) and the component (b) is less than 15% by mass, conductivity becomes difficult to be exhibited, and when the total of the component (a) and the component (b) is more than 40% by mass, the produced electrode becomes hard and may break, or the dispersibility may deteriorate.

In the slurry for a flexible electrode according to the present embodiment, it is preferable that of the component (a) and the component (b), the component (a) is 50 to 90% by mass, and the component (b) is 10 to 50% by mass. If the component (b) is less than 10% by mass, the effect of improving the conductivity of the flexible electrode cannot be obtained. If it is more than 50% by mass, the produced electrode becomes hard and may breaks during extending.

The carbon nanotube in the component (b) preferably has a fiber diameter of 1 to 20 nm. That is, if the fiber diameter is too small, the dispersibility tends to deteriorate, and the physical properties tend to decrease. Conversely, if the fiber diameter is too large, the conductivity tends to decrease during the production of the flexible electrode.

The graphene in the component (b) preferably has a diameter of 0.5 to 10 μm. That is, if the diameter is too small, the conductivity decreases during the production of the flexible electrode. Conversely if the diameter is too large, the flexible electrode tends to break during elongation.

The graphite in the component (b) preferably has a diameter of 0.5 to 10 μm. That is, if the diameter is too small, the conductivity decreases during the production of the flexible electrode, and if the diameter is too large, the flexible electrode tends to break during elongation.

The carbon black in the component (b) preferably has a DBP absorption amount under uncompressed conditions of 350 to 500 (mL/100 g) and a BET specific surface area of 800 to 1300 ($m^2$/g). That is, if the DBP absorption amount under uncompressed conditions and the BET specific surface area are too small, the conductivity-imparting effect at the time of producing a flexible electrode may decrease, and if the DBP absorption amount under uncompressed conditions and the BET specific surface area are too large, the slurry will not be uniform.

Note that the DBP absorption amount under uncompressed conditions of carbon black in the present invention is a value measured in accordance with JIS K6217-4. Further, the carbon black is preferably acetylene black.

Further, in the flexible electrode of the present invention, in addition to the above components, for example, ionic conductive agents (surfactants, ionic liquids, ammonium salts, inorganic salts), metal particles, conductive polymers, plasticizers, oils, crosslinking agents, anti-aging agents, flame retardants, coloring agents and the like may be appropriately used.

The slurry for a flexible electrode of the present invention can be produced, for example, as follows. That is, the emulsion, the component (a) and the component (b) are blended and dispersed by using a dispersing device such as a rotation/revolution type mixer, a media mill, a three-roller, a stirrer, and a supersonic device to prepare a slurry. Then, the slurry is coated on a chloroprene sheet so as to have a predetermined thickness (preferably 1 to 100 μm), and dried and/or cross-linked under a predetermined condition (for example, at 100° C. for 30 minutes), so that a flexible electrode can be made.

The slurry for a flexible electrode of the present invention preferably has the following characteristics.

(1) A shear viscosity at a shear rate of 1.0 $s^{-1}$ is 0.7 Pa·s to 50 Pa·s.

(2) A median diameter D50 of particles in the slurry is 0.1 to 10 μm.

The flexible electrode using the slurry of the present invention can be used, for example, for electronic devices such as actuators, sensors, and transducers. Therefore, another aspect of the present invention is a flexible electrode using the slurry of the present invention, and yet another aspect is an actuator, sensor, or transducer using the flexible electrode of the present invention. The purpose of producing an electrode having both conductivity and flexibility can be achieved without using a powerful dispersion device.

EXAMPLES

Next, examples and comparative examples will be described. However, the present invention is not limited to these examples.

First, prior to Examples and Comparative Examples, the following materials were prepared.

[Urethane Emulsion 1]
Superflex 300 manufactured by DKS Co. Ltd. (pH: 7.4, solid content: 30.2 (% by mass))
[Chloroprene Emulsion 1]
LC-21 manufactured by Denka Company Limited (pH: 7.0, solid content 30.2 (% by mass))
[Chloroprene Emulsion 2]
LV-60A manufactured by Denka Company Limited (pH: 12.0, solid content: 60.0 (% by mass))
[Carbon Black A (Component (a)]
DENKA BLACK FX-35 manufactured by Denka Company Limited (DBP oil absorption amount under uncompressed conditions: 267 (mL/100 g), BET specific surface area: 133 ($m^2$/g))
[Carbon Black B (Component (a)]
DENKA BLACK HS-100 manufactured by Denka Company Limited (DBP oil absorption amount under uncompressed conditions: 177 (mL/100 g), BET specific surface area: 39 ($m^2$/g))
[Carbon Black C (Component (a)]
DENKA BLACK AB powder manufactured by Denka Company Limited (DBP oil absorption amount under uncompressed conditions: 228 (mL/100 g), BET specific surface area: 68 ($m^2$/g))
[Carbon Black D (Component (a)]
SuperP manufactured by Imerys Graphite & Carbon (DBP oil absorption amount under uncompressed conditions: 233 (mL/100 g), BET specific surface area: 62 ($m^2$/g))
[Carbon black E (component (b)]
KETJENBLACK ECP300 manufactured by Lion Specialty Chemicals Co., Ltd. (DBP oil absorption amount under uncompressed conditions: 365 (mL/100 g), BET specific surface area: 800 ($m^2$/g))
[Carbon Black F (Component (b)]
KETJENBLACK ECP600JD manufactured by Lion Specialty Chemicals Co., Ltd. (DBP oil absorption amount under uncompressed conditions: 495 (mL/100 g), BET specific surface area: 1270 ($m^2$/g))
[Carbon Nanotube (Component (b)]
Flotube 9000 manufactured by Jiangsu Cnano Technology Limited (fiber diameter: 10 (nm)).
[Graphene (Component (b)]
Graphene powder manufactured by Aldrich (Diameter 5 (μm)).
[Graphite (Component (b)]
Graphite J-SP manufactured by Nippon Graphite Industries, Co., Ltd. (Diameter 7 (μm))

Next, a flexible electrode was produced using each of the above materials as described below.

Example 1

60.0 parts by mass of chloroprene emulsion 1 was weighed out and mixed with 40.0 parts by mass of carbon black B. 0.05 parts by mass of a dispersant for carbon black was added with respect to carbon black B. After adding water so that the mass % of the polymer component+component (a) in the slurry becomes 20 mass %, the mixture is dispersed using a rotation/revolution mixer (Awatori Rentaro ARV-310 manufactured by THINKY CORPORATION) and thus a slurry for flexible electrode was prepared. Then, on a chloroprene sheet having a thickness of 0.3 mm, the slurry for flexible electrode was coated so as to have a thickness of 30 μm, and dried at 100° C. for 30 minutes to produce a flexible electrode.

Examples 2 to 24, Comparative Examples 1 to 10

A slurry for a flexible electrode was prepared in the same manner as in Example 1 except that the types and mixing ratios of each component were changed as shown in Tables 1 to 8. Then, flexible electrodes were prepared in the same manner as in Example 1 using these flexible electrode slurries.

Using the flexible electrode slurry and the flexible electrode thus obtained, each characteristic was evaluated in accordance with the following criteria. These results are also shown in Tables 1 to 8 above.

[Slurry Viscosity]

The viscosity of each slurry for flexible electrode was measured using a cone-plate viscometer (MCR-300, manufactured by Anton Paar GmbH). The measurement conditions were as follows:

Measurement mode: shear mode
Shear rate: changed from $100\ s^{-1}$ to $0.01\ s^{-1}$
Measurement jig: cone plate (CP-50-2; diameter 50 mm, angle 2°, gap 0.045 mm)
Measurement temperature: 25° C.

[Agglomeration Diameter in Slurry (Median Diameter D50)]

[Preparing Measuring Sample]

0.5 g of the slurry for flexible electrode was weighed into a vial, and 25.0 g of distilled water was added. A bath-type ultrasonic cleaner was used for pre-measurement treatment, and the sample was homogenized by ultrasonic irradiation to prepare a measurement sample.

[Measurement of Median Diameter D50]

Using the measurement sample prepared by the above method, the median diameter D50 value of the aggregation diameter in the slurry for flexible electrode was measured according to the following method. The optical model of the LS 13 320 universal liquid module is set to carbon, 1.520 and water 1.333 as the refractive indexes repectively, and the module is washed. After performing offset measurement, optical axis adjustment, and background measurement under the condition of a pump speed of 50%, the prepared measurement sample was add to a particle size analyzer so that the relative density indicating the percentage of light that the particles scatter to the outside of the beam by the particles is 8 to 12% or so that the PIDS is 40 to 55%, and then ultrasonic irradiation was performed at 78 W for 2 minutes using a device attached to the particle size particle size analyzer (measurement pretreatment), and the particles were circulated for 30 seconds to remove air bubbles, and then the particle size distribution was measured. A graph of the volume % with respect to the granularity (particle size) was obtained, and the median diameter D50 value was obtained.

The measurement was carried out by changing the sampling location for each sample of the slurry for flexible electrode to obtain three measurement samples, measuring the particle size distribution, and determining the median diameter D50 value using the average value.

[Volume Resistance Value]

Figure 2:
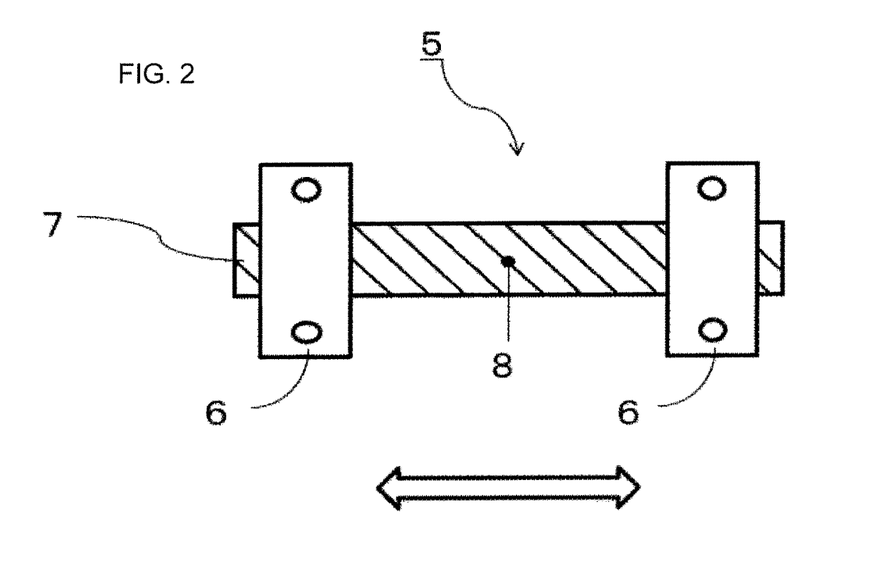
FIG. 2 is an explanatory diagram showing a method for evaluating a flexible electrode.

The volume resistance at 0% strain, the volume resistance at 100% strain, the volume resistance at 150% strain, and the volume resistance at 200% strain of each flexible electrode were evaluated as follows. The flexible electrode is cut into a strip having a length of 2 cm and a width of 6.5 cm, and both ends are fixed with a tensile jig as shown in FIG. 2. Then, 0, 100, 150, or 200% strain is applied to the flexible electrode using the tensile jig (uniaxial direction: the direction of the arrow in the figure), and the volume resistance value at that time was measured with Loresta GP manufactured by Mitsubishi Chemical Analytech Co., Ltd. At this time, a PSP probe was used as a probe, the applied voltage was set to 90 V, and the volume resistance was measured under the conditions of 23° C. and 50% relative humidity.

TABLE 1

|  |  | Example 1 | Example 2 | Example 3 | Example 4 | Example 5 |
|---|---|---|---|---|---|---|
| Emulsion Type |  | Chloroprene emulsion 1 | Chloroprene emulsion 1 | Chloroprene emulsion 1 | Chloroprene emulsion 1 | Chloroprene emulsion 1 |
| Carbon Material | Component (a) | Carbon black B | Carbon black B | Carbon black B | Carbon black B | Carbon black B |
| Ratio of polymer component + component (a) in the slurry (mass %)" |  | 20 | 20 | 20 | 30 | 30 |
| Polymer component/carbon material mass ratio |  | 60/40 | 70/30 | 85/15 | 70/30 | 85/15 |
| Slurry viscosity (Pa · s) |  | 1 | 0.5 | 0.3 | 0.5 | 0.7 |
| Agglomeration diameter in slurry (median diameter) (μm) |  | 0.5 | 0.3 | 0.3 | 0.3 | 0.9 |
| electrode Volume resistance (Ω · cm) | At strain 0% | 1.2 | 3.5 | 6.7 | 1.2 | 6.7 |
|  | At strain 100% | 5.4 | 28.7 | 47.3 | 5.8 | 64.5 |
|  | At strain 150% | 11.1 | 71.2 | 75.2 | 10.4 | 75.2 |
|  | At strain 200% | 13.9 | 212.0 | 240.4 | 18.7 | 376.6 |
| Slurry mixing state |  | Uniform | Uniform | Uniform | Uniform | Uniform |
| Electrode smoothness |  | Good | Good | Good | Good | Good |

TABLE 2

|  |  | Example 6 | Example 7 | Example 8 |
|---|---|---|---|---|
| Emulsion Type |  | Urethane emulsion 1 | Urethane emulsion 1 | Urethane emulsion 1 |
| Carbon Material | Component (a) | Carbon black B | Carbon black B | Carbon black B |
| Ratio of polymer component + component (a) in the slurry (mass %)" |  | 20 | 20 | 20 |
| Polymer component/carbon material mass ratio |  | 60/40 | 70/30 | 85/15 |

TABLE 2-continued

|  |  | Example 6 | Example 7 | Example 8 |
|---|---|---|---|---|
| Slurry viscosity (Pa·s) | | 3.2 | 2.4 | 1.1 |
| Agglomeration diameter in slurry (median diameter) (μm) | | 9.8 | 7.4 | 5.5 |
| electrode | At strain 0% | 2.3 | 5.7 | 7.7 |
| Volume | At strain 100% | 10.3 | 34.5 | 45.6 |
| resistance | At strain 150% | 13.5 | 72.0 | 77.9 |
| (Ω·cm) | At strain 200% | 17.4 | 234.0 | 243.0 |
| Slurry mixing state | | Uniform | Uniform | Uniform |
| Electrode smoothness | | Good | Good | Good |

TABLE 3

|  |  | Example 9 | Example 10 | Example 11 | Example 12 |
|---|---|---|---|---|---|
| Emulsion Type | | Chloroprene emulsion 1 | Chloroprene emulsion 1 | Chloroprene emulsion 1 | Chloroprene emulsion 1 |
| Carbon Material | Component (a) | Carbon black A | Carbon black C | Carbon black C | Carbon black D |
| Ratio of polymer component + component (a) in the slurry (mass %)" | | 20 | 20 | 20 | 20 |
| Polymer component/carbon material mass ratio | | 70/30 | 85/15 | 70/30 | 70/30 |
| Slurry viscosity (Pa·s) | | 1 | 0.5 | 0.6 | 0.7 |
| Agglomeration diameter in slurry (median diameter) (μm) | | 0.7 | 0.3 | 0.4 | 0.5 |
| electrode | At strain 0% | 6.2 | 2.5 | 1.2 | 0.8 |
| Volume | At strain 100% | 45.3 | 9.5 | 5.8 | 2.4 |
| resistance | At strain 150% | 70.1 | 16.2 | 10.4 | 3.9 |
| (Ω·cm) | At strain 200% | 109.3 | 27.2 | 18.7 | 5.4 |
| Slurry mixing state | | Uniform | Uniform | Uniform | Uniform |
| Electrode smoothness | | Good | Good | Good | Good |

TABLE 4

|  |  | Example 13 | Example 14 | Example 15 | Example 16 | Example 17 |
|---|---|---|---|---|---|---|
| Emulsion Type | | Chloroprene emulsion 1 | Urethane emulsion 1 | Chloroprene emulsion 1 | Chloroprene emulsion 1 | Chloroprene emulsion 1 |
| Carbon Material | Component (a) | Carbon Clack C | Carbon Clack C | Carbon Clack C | Carbon Clack C | Carbon Clack C |
|  | Component (b) | Carbon nanotube | Carbon nanotube | Carbon nanotube | Carbon nanotube | Carbon nanotube |
| Ratio of polymer component + component (a) + component (b) in the slurry (mass %)" | | 30 | 30 | 30 | 30 | 30 |
| Polymer component/carbon material mass ratio | | 85/15 | 85/15 | 85/15 | 85/15 | 85/15 |
| component (a)/component (b) mass ratio | | 90/10 | 90/10 | 80/20 | 60/40 | 50/50 |
| Slurry viscosity (Pa·s) | | 2 | 5.4 | 24 | 46 | 50 |
| Agglomeration diameter in slurry (median diameter) (μm) | | 1.4 | 3.3 | 5 | 9.8 | 9.8 |
| electrode | At strain 0% | 2.0 | 4.6 | 7.5 | 7.8 | 5.2 |
| Volume | At strain 100% | 9.0 | 15.3 | 34.9 | 40.0 | 44.6 |
| resistance | At strain 150% | 15.2 | 34.6 | 65.3 | 63.6 | 67.9 |
| (Ω·cm) | At strain 200% | 24.0 | 44.8 | 118.5 | 138.8 | 145.8 |
| Slurry mixing state | | Uniform | Uniform | Uniform | Uniform | Uniform |
| Electrode smoothness | | Good | Good | Good | Good | Good |

TABLE 5

|  | Example 18 | Example 19 | Example 20 | Example 21 | Example 22 |
|---|---|---|---|---|---|
| Emulsion Type | Chloroprene emulsion 1 | Urethane emulsion 1 | Chloroprene emulsion 1 | Chloroprene emulsion 1 | Chloroprene emulsion 1 |

TABLE 5-continued

|  |  | Example 18 | Example 19 | Example 20 | Example 21 | Example 22 |
|---|---|---|---|---|---|---|
| Carbon Material | Component (a) | Carbon Clack C | Carbon Clack C | Carbon Clack C | Carbon Clack C | Carbon Clack C |
|  | Component (b) | Carbon Clack E | Carbon Clack E | Carbon Clack E | Carbon Clack E | Carbon Clack E |
| Ratio of polymer component + component (a) + component (b) in the slurry (mass %)" |  | 20 | 20 | 20 | 20 | 20 |
| Polymer component/carbon material mass ratio |  | 85/15 | 85/15 | 85/15 | 85/15 | 85/15 |
| component (a)/component (b) mass ratio |  | 90/10 | 90/10 | 80/20 | 60/40 | 50/50 |
| Slurry viscosity (Pa · s) |  | 13 | 16 | 32 | 50 | 50 |
| Agglomeration diameter in slurry (median diameter) (μm) |  | 1.4 | 6.7 | 2.1 | 3.2 | 9.5 |
| electrode Volume resistance (Ω · cm) | At strain 0% | 2.1 | 5.8 | 3.7 | 5.9 | 6.8 |
|  | At strain 100% | 8.0 | 23.1 | 19.8 | 24.5 | 39.3 |
|  | At strain 150% | 15.5 | 35.2 | 34.7 | 43.7 | 52.8 |
|  | At strain 200% | 23.3 | 63.2 | 69.8 | 87.5 | 98.6 |
| Slurry mixing state |  | Uniform | Uniform | Uniform | Uniform | Uniform |
| Electrode smoothness |  | Good | Good | Good | Good | Good |

TABLE 6

|  |  | Exzample 23 | Exzample 24 |
|---|---|---|---|
| Emulsion Type |  | Chloroprene emulsion 1 | Chloroprene emulsion 1 |
| Carbon Material | Component (a) | Carbon Clack B | Carbon Clack B |
|  | Component (b) | Graphene | Graphite |
| Ratio of polymer component + component (a) + component (b) in the slurry (mass %)" |  | 20 | 20 |
| Polymer component/carbon material mass ratio |  | 60/40 | 60/40 |
| component (a)/component (b) mass ratio |  | 90/10 | 90/10 |
| Slurry viscosity (Pa · s) |  | 1.5 | 1 |
| Agglomeration diameter in slurry (median diameter) (Mm) |  | 0.8 | 1 |
| electrode Volume resistance (Ω · cm) | At strain 0% | 0.8 | 2.2 |
|  | At strain 100% | 5.1 | 23.8 |
|  | At strain 150% | 9.7 | 57.4 |
|  | At strain 200% | 20.7 | 117.0 |
| Slurry mixing state |  | Uniform | Uniform |
| Electrode smoothness |  | Good | Good |

TABLE 7

|  |  | Comparative Example 1 | Comparative Example 2 | Comparative Example 3 | Comparative Example 4 | Comparative Example 5 |
|---|---|---|---|---|---|---|
| Emulsion Type |  | Chloroprene emulsion 1 | Urethane emulsion 1 | Urethane emulsion 1 | Chloroprene emulsion 1 | Chloroprene emulsion 1 |
| Carbon Material | Component (a) | Carbon Clack C | Carbon Clack C | Carbon Clack C | Carbon Clack B | Carbon Clack B |
|  | Component (b) | Carbon Clack E | Carbon Clack F | Carbon nanotube | Graphene | Graphite |
| Ratio of polymer component + component (a) + component (b) in the slurry (mass %)" |  | 20 | 20 | 30 | 20 | 20 |
| Polymer component/carbon material mass ratio |  | 85/15 | 85/15 | 85/15 | 85/15 | 85/15 |
| component (a)/component (b) mass ratio |  | 40/60 | 40/60 | 40/60 | 40/60 | 40/60 |
| Slurry viscosity (Pa · s) |  | Not measurable | Not measurable | 10 | 10 | 10 |

TABLE 7-continued

|  | | Comparative Example 1 | Comparative Example 2 | Comparative Example 3 | Comparative Example 4 | Comparative Example 5 |
|---|---|---|---|---|---|---|
| Agglomeration diameter in slurry (median diameter) (μm) | | 1 | 24 | no less than 100 | 30 | 5.4 |
| electrode Volume resistance ($\Omega \cdot cm$) | At strain 0% | 15.7 | 110.2 | 4023.0 | 3630 | 2406 |
| | At strain 100% | 217.5 | Not measurable | Not measurable | Not measurable | Not measurable |
| | At strain 150% | 410.1 | Not measurable | Not measurable | Not measurable | Not measurable |
| | At strain 200% | 535.2 | Not measurable | Not measurable | Not measurable | Not measurable |
| Slurry mixing state | | Ununiform | Ununiform | Ununiform | Uniform | Uniform |
| Electrode smoothness | | Defective (cracked) | Defective (cracked) | Defective (cracked) | Defective (cracked) | Defective (cracked) |

TABLE 8

|  | | Comparative Example 6 | Comparative Example 7 | Comparative Example 8 | Comparative Example 9 | Comparative Example 10 |
|---|---|---|---|---|---|---|
| Emulsion Type | | Chloroprene emulsion 1 | Chloroprene emulsion 1 | Chloroprene emulsion 1 | Chloroprene emulsion 1 | Chloroprene emulsion 1 |
| Carbon Material | Component (a) | Carbon Clack B | Carbon Clack B | Carbon Clack B | Carbon Clack E | Carbon Clack F |
| Ratio of polymer component + component (a) in the slurry (mass %)" | | 20 | 20 | 20 | 20 | 20 |
| Polymer component/carbon material mass ratio | | 50/50 | 85/15 | 90/10 | 85/15 | 85/15 |
| Slurry viscosity ($Pa \cdot s$) | | 30 | Not measurable | Not measurable | 40 | 103 |
| Agglomeration diameter in slurry (median diameter) (μm) | | 2.6 | no less than 100 | 1 | 5.9 | 7.5 |
| electrode Volume resistance ($\Omega \cdot cm$) | At strain 0% | 0.9 | Not measurable | Not measurable | 24.7 | Not measurable |
| | At strain 100% | 5.0 | Not measurable | Not measurable | Not measurable | Not measurable |
| | At strain 150% | 7.4 | Not measurable | Not measurable | Not measurable | Not measurable |
| | At strain 200% | 10.7 | Not measurable | Not measurable | Not measurable | Not measurable |
| Slurry mixing state | | Ununiform | Ununiform | Ununiform | Ununiform | Ununiform |
| Electrode smoothness | | Defective (cracked) | Defective (cracked) | Good | Defective (cracked) | Defective (cracked) |

For the slurries and electrodes produced in the Examples and Comparative Examples, the state of slurry mixing and the smoothness of the electrodes were visually evaluated. From the results shown in Tables 1 to 8, the Examples showed that the slurry mixing state was uniform and the electrodes had good smoothness as compared with the Comparative Examples. The Examples was excellent in conductivity and also excellent in conductivity after extension. This is because in these Examples, the carbon material is sufficiently uniformly dispersed in the electrode, and the conductive path is formed evenly during the extension.

DESCRIPTION OF REFERENCE NUMERALS

1 Inductive actuator
2 dielectric layer
3 electrode layer
4 power supply
5 Resistance evaluation system
6 Fixing jig
7 Flexible electrode
8 measurement point

The invention claimed is:

1. A slurry for a flexible electrode, consisting essentially of a component (a), and optionally a component (c) dispersed in an aqueous emulsion, wherein
the emulsion consists essentially of at least one polymer component selected from the group consisting of acrylic polymers, urethane polymers, fluorine polymers, urea polymers, chloroprene polymers, and butadiene polymers;
the emulsion has a pH of 6.5 to 8.0;
in the slurry for a flexible electrode, a total of the at least one polymer component and the component (a) is 20 to 30% by mass;
of the total of the at least one polymer component and the component (a) in the slurry for a flexible electrode, the at least one polymer component is 60 to 85% by mass, and the component (a) is 15 to 40% by mass; and
component (a) consists essentially of carbon black having a DBP absorption amount under uncompressed conditions of 150 to 300 mL/100 g and a BET specific surface area of 35 to 140 $m^2/g$; and
component (c) consists essentially of at least one member selected from the group consisting of surfactants, ionic liquids, ammonium salts, inorganic salts, metal particles, conductive polymers, plasticizers, oils, cross-linking agents, anti-aging agents, flame retardants and coloring agents.

2. The slurry for a flexible electrode according to claim 1, wherein a shear viscosity at a shear rate of 1.0 s$^{-1}$ is 0.7 Pa·s to 50 Pa·s.

3. The slurry for a flexible electrode according to claim 1, wherein a median diameter D50 of particles in the slurry is 0.1 to 10 µm.

4. The slurry for a flexible electrode according to claim 1, wherein the carbon black of the component (a) and/or the component (b) is acetylene black.

5. The slurry for a flexible electrode according to claim 1, wherein the at least one polymer component is a chloroprene polymer.

6. The slurry for a flexible electrode according to claim 1, wherein the at least one polymer component is a urethane polymer.

7. A flexible electrode comprising the slurry for a flexible electrode according to claim 1.

8. An actuator, a sensor, or a transducer comprising the flexible electrode according to claim 7.

9. A slurry for a flexible electrode, consisting essentially of a component (a) and a component (b), and optionally a component (c) dispersed in an aqueous emulsion, wherein
the emulsion consists essentially of at least one polymer component selected from the group consisting of acrylic polymers, urethane polymers, fluorine polymers, urea polymers, chloroprene polymers, and butadiene polymers;
the emulsion has a pH of 6.5 to 8.0;
in the slurry for a flexible electrode, a total of the at least one polymer component, the component (a) and the component (b) is 20 to 30% by mass;
of the total of the at least one polymer component, the component (a) and the component (b) in the flexible electrode slurry, the at least one polymer component is 60 to 85% by mass, and a total of the component (a) and the component (b) is 15 to 40% by mass;
of the component (a) and the component (b), the component (a) is 50 to 90% by mass, and the component (b) is 10 to 50% by mass;
component (a) consists essentially of carbon black having a DBP absorption amount under uncompressed conditions of 150 to 300 mL/100 g and a BET specific surface area of 35 to 140 m$^2$/g;
component (b) consists essentially of one or more carbons selected from the group consisting of the following α, (β,γ, and δ
α: carbon nanotube having a fiber diameter of 1 to 20 nm
β: graphene having a diameter of 0.5 to 10 µm
γ: graphite having a diameter of 0.5 to 10 µm
δ: carbon black having a DBP absorption amount under uncompressed conditions of 350 to 500 mL/100 g and a specific surface area of 800 to 1300 m$^2$/g; and
component (c) consists essentially of at least one member selected from the group consisting of surfactants, ionic liquids, ammonium salts, inorganic salts, metal particles, conductive polymers, plasticizers, oils, cross-linking agents, anti-aging agents, flame retardants and coloring agents.

10. The slurry for a flexible electrode according to claim 9, wherein a shear viscosity at a shear rate of 1.0 s$^{-1}$ is 0.7 Pa·s to 50 Pa·s.

11. The slurry for a flexible electrode according to claim 9, wherein a median diameter D50 of particles in the slurry is 0.1 to 10 µm.

12. The slurry for a flexible electrode according to claim 9, wherein the carbon black of the component (a) and/or the component (b) is acetylene black.

13. The slurry for a flexible electrode according to claim 9, wherein the at least one polymer component is a chloroprene polymer.

14. The slurry for a flexible electrode according to claim 9, wherein the at least one polymer component is a urethane polymer.

15. A flexible electrode comprising the slurry for a flexible electrode according to claim 9.

16. An actuator, a sensor, or a transducer comprising the flexible electrode according to claim 15.

* * * * *

UNITED STATES PATENT AND TRADEMARK OFFICE
CERTIFICATE OF CORRECTION

PATENT NO. : 11,015,067 B2
APPLICATION NO. : 16/637265
DATED : May 25, 2021
INVENTOR(S) : Yoko Horikoshi and Tetsuya Ito

Page 1 of 1

It is certified that error appears in the above-identified patent and that said Letters Patent is hereby corrected as shown below:

In the Claims

In Claim 9 at Column 16, Line 10, the wording "($\beta$, $\gamma$, and $\partial$" should read -- $\beta$, $\gamma$, and $\partial$ --.

Signed and Sealed this
Twenty-sixth Day of April, 2022

Katherine Kelly Vidal
*Director of the United States Patent and Trademark Office*